US012680682B2

(12) United States Patent
Gessner et al.

(10) Patent No.: US 12,680,682 B2
(45) Date of Patent: Jul. 14, 2026

(54) HEIGHT ADJUSTABLE CEILING MOUNT FOR LINEAR LIGHT FIXTURE

(71) Applicant: Diem GmbH, Graz (AT)

(72) Inventors: Moritz Gessner, Graz (AT); René Hendler, Stattegg (AT); Dominic Hosch, New York, NY (US); Stefan Krotmeier, New York, NY (US)

(73) Assignee: DIEM GmbH, Graz (AT)

( * ) Notice: Subject to any disclaimer, the term of this patent is extended or adjusted under 35 U.S.C. 154(b) by 0 days.

(21) Appl. No.: 18/664,647

(22) Filed: May 15, 2024

(65) Prior Publication Data

US 2024/0384862 A1 Nov. 21, 2024

Related U.S. Application Data

(60) Provisional application No. 63/466,409, filed on May 15, 2023.

(51) Int. Cl.
*F21V 21/14* (2006.01)
*E04B 1/24* (2006.01)
(Continued)

(52) U.S. Cl.
CPC ............ *F21V 21/14* (2013.01); *F21V 21/108* (2013.01); *E04B 2001/2439* (2013.01);
(Continued)

(58) Field of Classification Search
CPC .. E04B 2/768; E04B 2001/2439; E04B 9/006; E04B 9/06; E04B 9/10; F21S 8/02;
(Continued)

(56) References Cited

U.S. PATENT DOCUMENTS 1,260,123 A * 3/1918 Areson ..................... E04B 9/20 248/327
2,642,251 A * 6/1953 Janness ................... F21V 21/04 362/217.08
(Continued)

FOREIGN PATENT DOCUMENTS

CN 111287378 A * 6/2020 ............. E04B 9/065
CN 215372241 U 12/2021
(Continued)

OTHER PUBLICATIONS

Machine translation of KR-19990014355-U retrieved from the FIT database of PE2E search. (Year: 2025).*
(Continued)

*Primary Examiner* — Colin J Cattanach
(74) *Attorney, Agent, or Firm* — Davidson Kappel LLC

(57) ABSTRACT

A height adjustable ceiling mount assembly for a linear light fixture includes a base configured for being connected to a top surface of the linear light fixture; an arm extending upward from the bracket; a mount for connecting to a beam of a ceiling installation to mount the linear light fixture on the ceiling installation; and a fastener for removably connecting the mount to the arm at a plurality of different vertical positions to vary a height of the ceiling mount assembly. The arm includes a plurality of slots, each of the slots defining one of the vertical positions.

17 Claims, 4 Drawing Sheets

(51) Int. Cl.

| | |
|---|---|
| ***E04B 2/76*** | (2006.01) |
| ***E04B 9/00*** | (2006.01) |
| ***E04B 9/06*** | (2006.01) |
| ***E04B 9/10*** | (2006.01) |
| ***F21S 8/00*** | (2006.01) |
| ***F21S 8/02*** | (2006.01) |
| ***F21S 8/04*** | (2006.01) |
| ***F21S 8/06*** | (2006.01) |
| ***F21S 8/08*** | (2006.01) |
| ***F21V 21/03*** | (2006.01) |
| ***F21V 21/04*** | (2006.01) |
| ***F21V 21/10*** | (2006.01) |
| ***F21V 21/104*** | (2006.01) |
| ***F21V 21/108*** | (2006.01) |
| ***F21V 21/112*** | (2006.01) |
| ***F21V 21/116*** | (2006.01) |

(52) U.S. Cl.

CPC ............... *E04B 2/768* (2013.01); *E04B 9/006* (2013.01); *E04B 9/06* (2013.01); *E04B 9/10* (2013.01); *F21S 8/02* (2013.01); *F21S 8/026* (2013.01); *F21S 8/028* (2013.01); *F21S 8/03* (2013.01); *F21S 8/031* (2013.01); *F21S 8/04* (2013.01); *F21S 8/043* (2013.01); *F21S 8/046* (2013.01); *F21S 8/06* (2013.01); *F21S 8/063* (2013.01); *F21S 8/088* (2013.01); *F21V 21/03* (2013.01); *F21V 21/04* (2013.01); *F21V 21/041* (2013.01); *F21V 21/042* (2013.01); *F21V 21/044* (2013.01); *F21V 21/045* (2013.01); *F21V 21/046* (2013.01); *F21V 21/047* (2013.01); *F21V 21/048* (2013.01); *F21V 21/049* (2013.01); *F21V 21/10* (2013.01); *F21V 21/104* (2013.01); *F21V 21/112* (2013.01); *F21V 21/116* (2013.01)

(58) Field of Classification Search

CPC .... F21S 8/026; F21S 8/028; F21S 8/03; F21S 8/031; F21S 8/04; F21S 8/043; F21S 8/046; F21S 8/06; F21S 8/063; F21S 8/088; F21V 21/03; F21V 21/04; F21V 21/041; F21V 21/042; F21V 21/043; F21V 21/044; F21V 21/045; F21V 21/046; F21V 21/047; F21V 21/048; F21V 21/049; F21V 21/10; F21V 21/104; F21V 21/112; F21V 21/14; F21V 21/116

See application file for complete search history.

(56) References Cited

U.S. PATENT DOCUMENTS

| | | | | |
|---|---|---|---|---|
| 2,854,205 | A * | 9/1958 | Kruger .................... | F21V 21/04 248/343 |
| 2,939,669 | A * | 6/1960 | Pascucci ................. | F21V 21/04 248/343 |
| 3,953,015 | A * | 4/1976 | Taylor ................... | E04F 21/185 52/DIG. 1 |
| 4,712,168 | A * | 12/1987 | Scherrer ............... | F21V 21/049 362/427 |
| 11,530,778 | B1 * | 12/2022 | Presz-Lafreniere .... | F21S 8/026 |
| 2014/0021316 | A1 | 1/2014 | Adams et al. | |
| 2016/0076746 | A1 * | 3/2016 | Porciatti ............... | F21V 33/006 362/404 |
| 2017/0307189 | A1 | 10/2017 | Eidsvold et al. | |
| 2021/0348730 | A1 * | 11/2021 | Porciatti .................. | F21S 4/28 |
| 2022/0316207 | A1 * | 10/2022 | Yeo ......................... | E04B 9/242 |

FOREIGN PATENT DOCUMENTS

| | | | | |
|---|---|---|---|---|
| GB | 2138862 | B | | 9/1986 |
| JP | H0566120 | U | | 8/1993 |
| KR | 19990014355 | U | * | 4/1999 |

OTHER PUBLICATIONS

Machine translation of CN-111287378-A retrieved from the FIT database of PE2E search. (Year: 2025).*

L Mounting Bracket With Back Strap Assembly W/5' Bolts, Allied Bolt-Part#2951, Allied Bolt Products, LLC, last downloaded May 15, 2024 at https://alliedboltinc.com/Poleline-Hardware/Mounting-Bracket~114/L-MOUNTING-BRACKET-WITH-BACK-STRAP-ASSEMBLY-w-5-inch-BOLTS~2951, estimated website creation Dec. 2015, last update estimation Apr. 2023.

Inverted Link Plates For Bottom-Mount (Under-Frame) Couplers, last downloaded on May 15, 2024 at https://www.equalizerhitch.com/manuals-and-guides/installation-guides/inverted-link-plates-for-bottom-mount-under-frame-couplers, estimated website creation date Jan. 2020, last update estimation May 2024.

Cutout Mounting Bracket, last downloaded on May 15, 2024 at https://www.pwrmfg.com/power-manufacturing/cross-arm-braces-brackets/ estimated website creation date Jan. 2016, last update estimation May 2024.

Slate 2m Wood Ceilings by Axis, axislighting.com, SLS.Spec, Apr. 20, 2023.

* cited by examiner

- Prior Art -

HEIGHT ADJUSTABLE CEILING MOUNT FOR LINEAR LIGHT FIXTURE

This claims priority of U.S. Provisional Patent application 63/466,409, filed May 15, 2023 the entire disclosure of which is hereby incorporated by reference herein.

The present disclosure relates generally to ceiling mounted linear light fixtures, and specifically to height adjustable ceiling mounted linear light fixtures.

BACKGROUND

Ceilings can be made of longitudinal wood strips separated from each other by gaps. Linear light fixtures can be mounted in the gaps.

FIG. 3 shows a known system for mounting a light fixture 300 on a ceiling installation. The ceiling installation includes a plurality of mounting beams 302, 304 intersecting each other, and a plurality of wood strips 305 mounted between the mounting beams 302, 304 and running parallel to the mounting beam 302. A ceiling mount assembly 306 mounts the light fixture 300 on the beam 302. The ceiling mount assembly 306 includes an arm 308 for wrapping around and resting on a top edge 302*a* of the beam 302, and a base 310 connected to the lower end of arm 308 that is fixed to a top surface 300*a* of the light fixture 300. The ceiling mount assembly 306 has fixed dimensions and is not adjustable to vary the height of the light fixture with respect to the beam 302. Thus, the height of the light fixture 300 with respect to wood strips 305 depends solely on the height of the beam 302 relative to the height of the wood strips 305.

SUMMARY

A height adjustable ceiling mount assembly for a linear light fixture includes a base configured for being connected to a top surface of the linear light fixture; an arm extending upward from the bracket; a mount for connecting to a beam of a ceiling installation to mount the linear light fixture on the ceiling installation; and a fastener for removably connecting the mount to the arm at a plurality of different vertical positions to vary a height of the ceiling mount assembly. The arm includes a plurality of slots, each of the slots defining one of the vertical positions.

A height adjustable ceiling mount assembly for a linear light fixture is provided including a base configured for being connected to a top surface of the linear light fixture; an arm extending upward from the bracket; a mount for connecting to a beam of a ceiling installation to mount the linear light fixture on the ceiling installation; and a fastener for removably connecting the mount to the arm at a plurality of different vertical positions. The arm includes at least one slot and the fastener passes horizontally through the at least one slot.

A height adjustable ceiling mount assembly for a linear light fixture is provided including a base configured for being connected to a top surface of the linear light fixture; an arm connected to the bracket; a mount for connecting to a beam of a ceiling installation to mount the linear light fixture on the ceiling installation; and a fastener for removably connecting the mount to the arm at a plurality of different vertical positions. The arm is an L-shaped bracket formed by a shorter section fixed to the base and a longer section extending upward from the base and for receiving the fastener.

A height adjustable ceiling mount assembly for a linear light fixture is provided including a base configured for being connected to a top surface of the linear light fixture; an arm extending upward from the bracket; a mount for connecting to a beam of a ceiling installation to mount the linear light fixture on the ceiling installation; and a fastener for removably connecting the mount to the arm at a plurality of different vertical positions. The arm includes a plurality of downward facing surfaces for vertically contacting the fastener at each of the vertical positions.

A height adjustable ceiling mount assembly for a linear light fixture is provided including a base configured for being connected to a top surface of the linear light fixture; an arm connected to the bracket; a mount for connecting to a beam of a ceiling installation to mount the linear light fixture on the ceiling installation; and a fastener for removably connecting the mount to the arm at a plurality of different vertical positions. The arm is an L-shaped bracket formed by a shorter section fixed to the base and a longer section extending upward from the base and for receiving the fastener.

A height adjustable ceiling mount assembly for a linear light fixture is provided including a base configured for being connected to a top surface of the linear light fixture; an arm extending upward from the bracket; a mount for connecting to a beam of a ceiling installation to mount the linear light fixture on the ceiling installation; and a fastener for removably connecting the mount to the arm at a plurality of different vertical positions. The arm includes a first vertically extending planar surface and a second vertically extending planar surface. The fastener includes a nut for contacting the first vertically extending planar surface in a mounted orientation of the mount assembly. The mount is configured for contacting the second vertically extending planar surface in the mounted orientation of the mount assembly.

BRIEF DESCRIPTION OF THE DRAWINGS

The present disclosure is described below by reference to the following drawings, in which.

DETAILED DESCRIPTION

Figure 1:
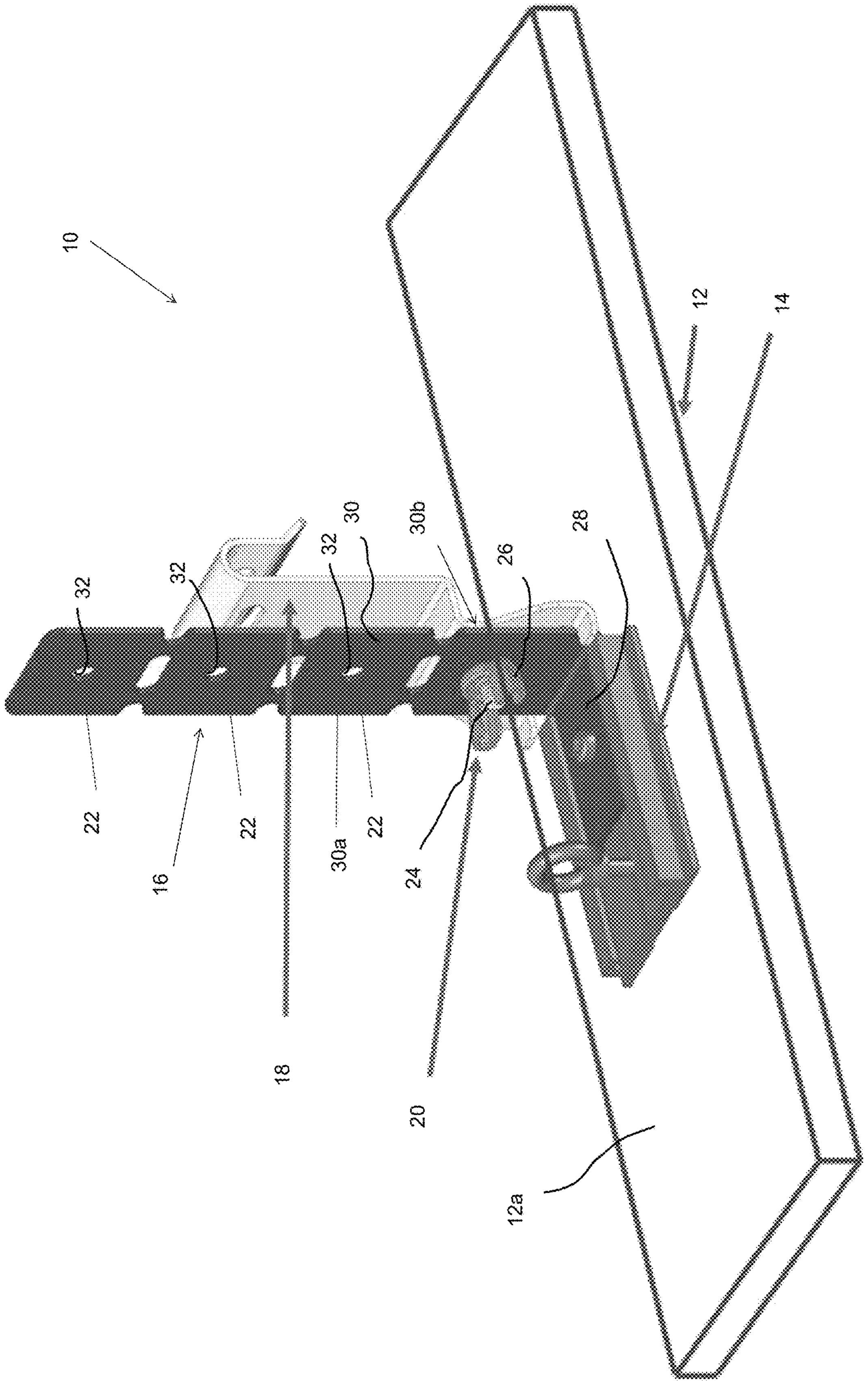
FIG. 1 shows a perspective view of a height adjustable ceiling mount assembly for a linear light fixture in accordance with a first embodiment of the present disclosure.
Figure 3:
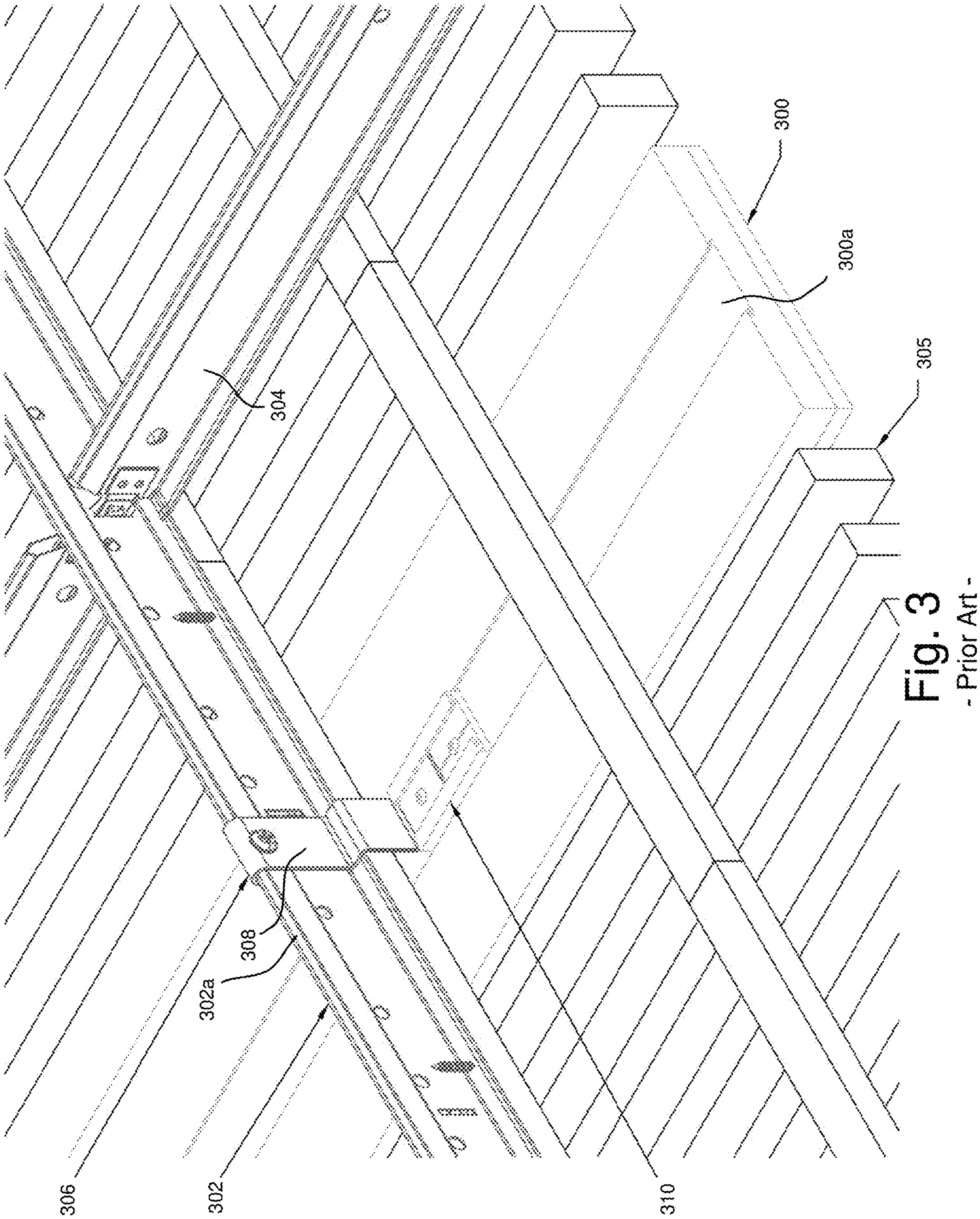
FIG. 3 shows a known system for mounting a light fixture on a ceiling installation including a ceiling mount assembly having fixed dimensions.

FIG. 1 shows a height adjustable ceiling mount assembly 10 for a linear light fixture 12 in accordance with a first embodiment of the present disclosure. In contrast to the known ceiling mount assembly 306, the ceiling mount assembly 10 has variable dimensions and is adjustable to vary the height of a light fixture with respect to the beam 302. Thus, the height of the light fixture 12 with respect to wood strips 305 (FIG. 3) can also be varied by height adjustable ceiling mount assembly 10.

The height adjustable ceiling mount assembly 10 includes a base 14 configured for being connected to a top surface 12*a* of the linear light fixture 12. Height adjustable ceiling mount assembly 10 further includes an arm 16 extending upward from the base 14, and a mount 18 for connecting to a beam 302 (FIG. 3) of a ceiling installation to mount the linear light fixture 12 on the ceiling installation. Assembly 10 also includes a fastener 20 for removably connecting the mount 18 to the arm 16 at a plurality of different vertical positions. The arm 16 includes a plurality of slots 22, each defining one of the vertical positions.

The fastener 20 is configured for being mounted to pass horizontally through any of the slots 22. More specifically, the fastener 20 includes a threaded shaft 24 fixed to arm 16 and a threaded nut 26 for removably fixing to threaded shaft 24. The threaded shaft 24 is configured for being mounted to pass horizontally through any of the slots 22. Each of the Slots 22 have a circular cross-sectional to provide a complementary shape and size to receive the threaded shaft 24.

The arm 16 is an L-shaped bracket formed by a shorter section 28, which is configured for being fixed to the base 14, and a longer section 30, which extends upward from the base 14 and is configured for receiving the fastener 20. For receiving the fastener 20, he longer section 30 of arm 16 includes the slots 22, which each define a respective downward facing surface 32 for vertically contacting the fastener 20, specifically the threaded shaft 24, at each of the vertical positions.

The arm 16, specifically the longer section 30 of arm 16, includes a first vertically extending planar surface 30*a* and a second vertically extending planar surface 30*b*. The threaded nut 26 is for contacting the first vertically extending planar surface 30*a* in a mounted orientation of the mount assembly 10 and the mount 18 is configured for contacting the second vertically extending planar surface 30*b* in the mounted orientation of the mount assembly 10.

Figure 2B:
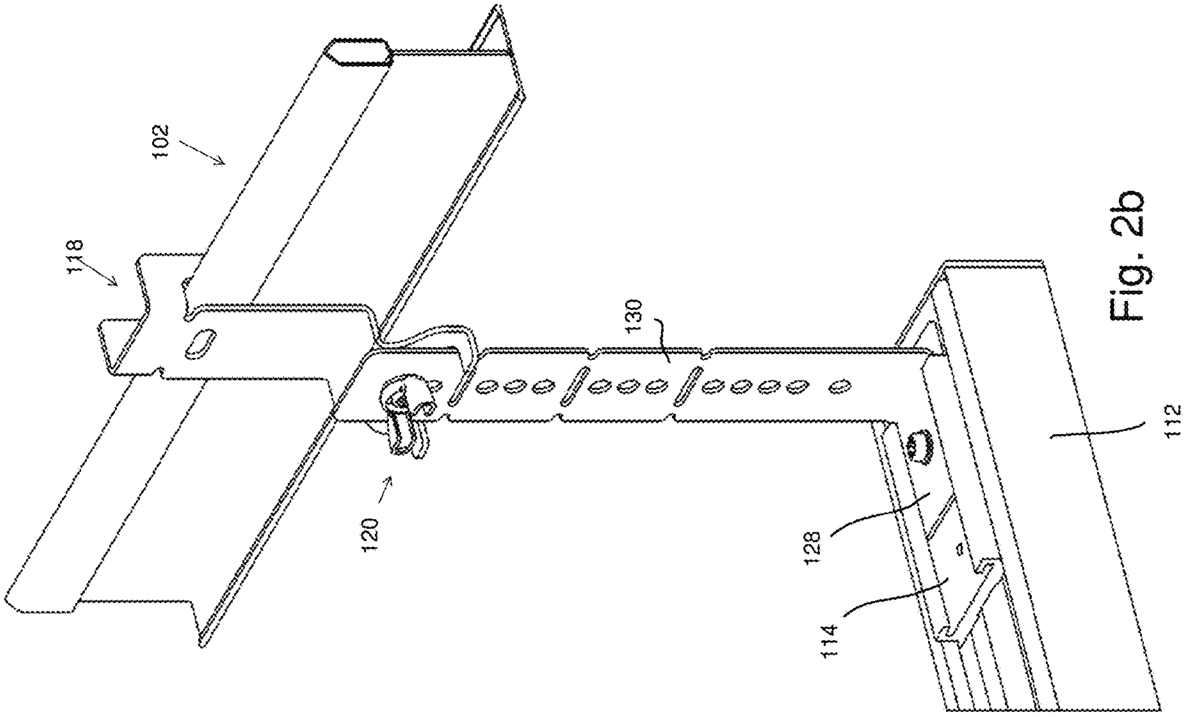
FIG. 2*b* shows a perspective view of the height adjustable ceiling mount assembly of FIG. 2*a* in a largest height of the mount assembly.
Figure 2A:
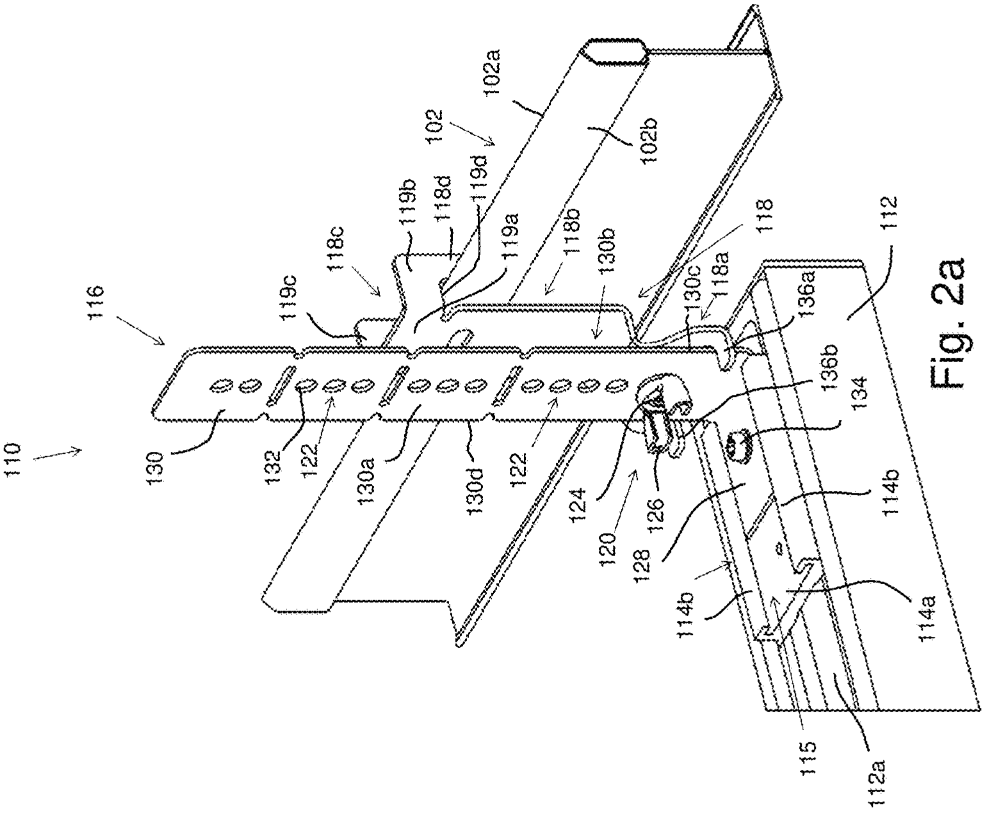
FIG. 2*a* shows a perspective view of a height adjustable ceiling mount assembly for a linear light fixture in accordance with a second embodiment of the present disclosure in a smallest height of the mount assembly.
Figure 2C:
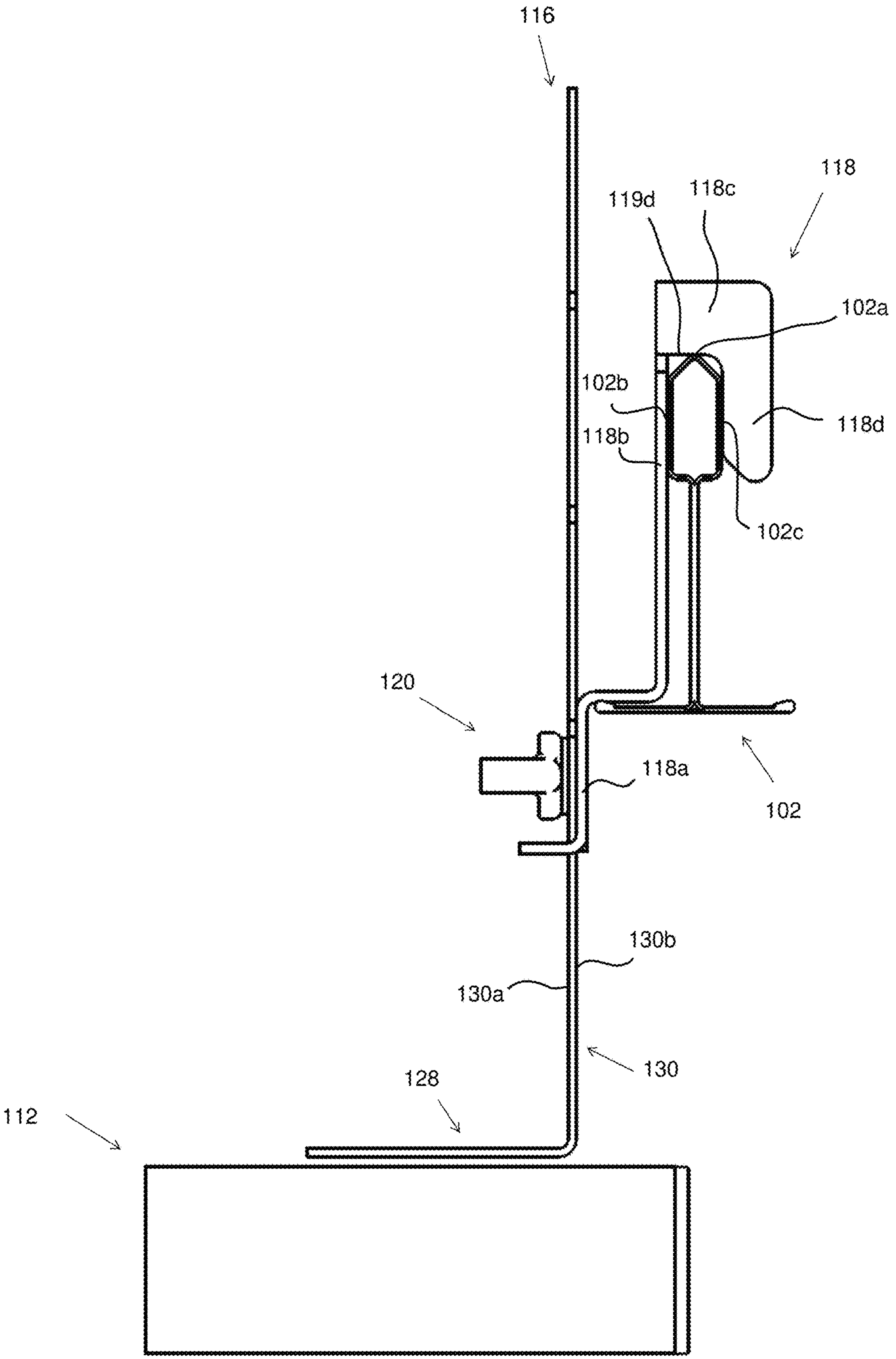
FIG. 2*c* shows a side view of the height adjustable ceiling mount assembly of FIGS. 2*a* and 2*b*.

FIGS. 2*a* to 2*c* show a height adjustable ceiling mount assembly 110 in accordance with another embodiment of the present disclosure. Mount assembly 110 includes a base 114 configured for being connected to a top surface 112*a* of the linear light fixture 112. Height adjustable ceiling mount assembly 110 further includes an arm 116 extending upward from the base 114, and a mount 118 for connecting to a beam 102 (FIG. 2*c*) of a ceiling installation to mount the linear light fixture 112 on the ceiling installation. Assembly 110 also includes a fastener 120 for removably connecting the mount 18 to the arm 116 at a plurality of different vertical positions. The arm 116 includes a plurality of slots 122 each defining one of the vertical positions. In the embodiment shown in FIGS. 2*a* to 2*c*, the arm 116 includes fifteen different slots 122, but in other embodiments, the arm 116 can include between three and twenty-five slots. To illustrate the range of heights, FIG. 2*a* shows the fastener 120 being fixed to the lowest slot 122 and FIG. 2*b* shows the fastener 120 being fixed to the highest slot 122.

The fastener 120 is configured for being mounted to pass horizontally through any of the slots 122. More specifically, the fastener 120 includes a threaded shaft 124 fixed to the mount 118 and a threaded nut 126 for removably fixing to threaded shaft 124. Threaded shaft 124 is configured for being mounted to pass horizontally through any of the slots 122. Each of the slots 122 have a circular cross-sectional to provide a complementary shape and size to receive the threaded shaft 124.

The arm 116 is an L-shaped bracket formed by a shorter section 128, which is configured for being removably fixed to the base 114, and a longer section 130, which extends upward from the base 114 and is configured for receiving the fastener 120. The longer section 30 of arm 116 includes the slots 122, which each define a respective downward facing surface 132 for vertically contacting the fastener 120, specifically the threaded shaft 124, at each of the vertical positions.

The arm 116, specifically the longer section 130 of the arm 116, includes a first vertically extending planar surface 130*a* and a second vertically extending planar surface 130*b*. The threaded nut 126 is for contacting the first vertically extending planar surface 130*a* in a mounted orientation of the mount assembly 110 and the mount 118 is configured for contacting the second vertically extending planar surface 130*b* in the mounted orientation of the mount assembly 110.

The base 114 includes a lower section 114*a* and two overhangs 114*b* that extend above the lower section 114*a* to define a slot 115 for receiving the shorter section 128 of the arm 116. The shorter section 128 is configured for being inserted vertically between lower section 114*a* and overhangs 114 such that a lower surface of shorter section 128 contacts the lower section 114*a* and an upper surface of the shorter section 128 contacts the overhangs 114*b*. After the shorter section 128 is slid into the slot 115, a fastener 134 can be inserted through a hole in the shorter section 128 to fix shorter section 128 in place in slot 115 and prevent the arm 116 from being movable horizontally with respect to base 114.

At a lower end thereof, the mount 118 includes two lateral guides 136*a*, 136*b* for contacting opposite lateral edges 130*c*, 130*d* of longer section 130. The lateral guides 136*a*, 136*b* are positioned below fastener 120. The guides 136*a*, 136*b* maintain the mount 118 in vertical alignment with the longer section 130 when the fastener 120 is mounted in a new slot 122. To move from the lowest slot position shown in FIG. 2*a* and the highest slot position in FIG. 2*b*, a user can loosen and remove the threaded nut 126 from the threaded shaft 124, remove the threaded shaft 124 from the slot 122, and move the mount 118 vertically to insert the threaded shaft 124 into the different slot 122. The guides 136*a*, 136*b* are configured to be brought into contact with the edges 130*c*, 130*d* as the threaded shaft 124 is inserted into the new slot 122. Then the threaded nut 126 can be screwed onto the threaded shaft 124 and tightened to removably fixed the mount 118 in a new vertical position.

The guides 136*a*, 136*b* extend horizontally from a lower section 118*a* of the mount 118 greater than a thickness of the longer section 130. The lower section 118*a* is flat and contacts the planar surface 130*b* of the longer section 130. The mount 118 further includes, above the lower section 118*a*, an intermediate section 118*b* that is horizontally spaced from the lower section 118*a*. The intermediate section 118*b* is configured for contacting a first vertically extending surface 102*a* of the beam 102. Above the intermediate section 118, the mount 118 further includes an upper section 118*c* configured for resting on an upper surface 102*b* of the beam 102. The upper section 118*c* includes a first portion 119*a* that continues the extension of 118*b*, and a two wing portions 119*b*, 119*c* on opposite edges of the first portion 119*a* that extend away from the first portion 119*a* and away from the longer section 130. The bottom edges 119*d* of the wing portions 119*b*, 119*c* contact the upper surface 102*b* of the beam 102. Together, the portions 119*a* to 119*c* form a C-shape when the mount 118 is viewed downward from above. The mount 118 further includes a hook section 118*d* extending downward from the upper section 118*c* to contact a second vertically extending surface 102*c* of the beam 102, positioned opposite of the first vertically extending surface 102*a* that the intermediate section 118*b* contacts.

In the preceding specification, the present disclosure has been described with reference to specific exemplary embodiments and examples thereof. It will, however, be evident that various modifications and changes may be made thereto without departing from the broader spirit and scope of present disclosure as set forth in the claims that follow. The specification and drawings are accordingly to be regarded in an illustrative manner rather than a restrictive sense.

LIST OF REFERENCE NUMERALS

10 height adjustable ceiling mount assembly
12 linear light fixture
12*a* top surface
14 base
16 arm
18 mount
20 fastener
22 slots
24 threaded shaft
26 threaded nut
28 shorter section
30 longer section
30*a* first vertically extending planar surface
30*b* planar surface
32 respective downward facing surface
102 beam
102*a* first vertically extending surface
102*b* upper surface
102*c* surface
110 mount assembly
112 linear light fixture
112*a* top surface
114 base
114*a* lower section
114*b* two overhangs
115 slot
116 arm
118 mount
118*a* lower section
118*b* intermediate section
118*c* upper section
118*d* hook section
119*a* first portion
119*b* two wing portions
119*c* two wing portions
119*d* bottom edges
120 fastener
122 slots
124 threaded shaft
126 threaded nut
128 shorter section
130 longer section
130*a* first vertically extending planar surface
130*b* planar surface
130*c* opposite lateral edges
130*d* opposite lateral edges
132 respective downward facing surface
134 fastener
136*a* guides
136*b* guides
300 light fixture
302 beam
304 beam
305 wood strips
306 known ceiling mount assembly
308 mount
310 base

What is claimed is:

1. A height adjustable ceiling mount assembly for a linear light fixture comprising:

a base configured for being connected to a top surface of the linear light fixture;

an arm extending upward from the base;

a mount for connecting to a beam of a ceiling installation to mount the linear light fixture on the ceiling installation; and a fastener for removably connecting the mount to the arm at a plurality of different vertical positions to vary a height of the ceiling mount assembly, the arm including a plurality of slots, each of the slots defining one of the vertical positions, the fastener including a threaded shaft fixed to the mount and a nut configured for removably fixing to the threaded shaft, the threaded shaft being configured for being alternatively passed horizontally through each slot.

2. The height adjustable ceiling mount assembly as recited in claim 1 wherein the arm is an L-shaped bracket formed by a shorter section fixed to the base and a longer section extending upward from the base and including the slots for receiving the fastener.

3. The height adjustable ceiling mount assembly as recited in claim 2 wherein the mount includes two guides configured for contacting opposite lateral edges of the longer section.

4. The height adjustable ceiling mount assembly as recited in claim 3 wherein the two guides are on a lower end of the mount.

5. The height adjustable ceiling mount assembly as recited in claim 1 wherein the mount includes an upper section configured for resting on an upper surface of the beam.

6. The height adjustable ceiling mount assembly as recited in claim 1 wherein a bottom surface of the base is configured, in a mounted orientation of the mount assembly, for contacting the top surface of the linear light fixture with the bottom surface of the base and the top surface of the linear light fixture extending in a same horizontal plane.

7. The height adjustable ceiling mount assembly as recited in claim 6 wherein the arm includes a first vertically extending planar surface and a second vertically extending planar surface, the nut contacting the first vertically extending planar surface in the mounted orientation of the mount assembly, the mount contacting the second vertically extending planar surface in the mounted orientation of the mount assembly, the first vertically extending planar surface and the second vertically extending planar surface configured for extending vertically with respect to the bottom surface of the base in the mounted orientation of the mount assembly.

8. The height adjustable ceiling mount assembly as recited in claim 1 wherein the arm includes a shorter section fixed to the base in a horizontal plane and a longer section extending upward from the base and including the slots for receiving the fastener.

9. The height adjustable ceiling mount assembly as recited in claim 8 wherein the base includes a slot for receiving the shorter section of the arm.

10. The height adjustable ceiling mount assembly as recited in claim 9 wherein the base includes a lower section and at least one overhang that extends above the lower section to define the slot for receiving the shorter section of the arm.

11. The height adjustable ceiling mount assembly as recited in claim 10 wherein the shorter section of the arm is configured for being inserted vertically between the lower section and the at least one overhang of the base such that a lower surface of the shorter section of the arm contacts the lower section of the base and an upper surface of the shorter section of the arm contacts the at least one overhang of the base.

12. The height adjustable ceiling mount assembly as recited in claim 1 wherein the mount includes an upper section that is configured for resting on an upper surface of the beam of the ceiling installation and a lower section that includes the threaded shaft.

13. The height adjustable ceiling mount assembly as recited in claim 12 wherein the mount includes an intermediate section vertically between the upper section and the lower section, the intermediate section being configured for contacting a first vertically extending surface of the beam.

14. The height adjustable ceiling mount assembly as recited in claim 13 wherein the mount includes a hook section extending downward from the upper section to contact a second vertically extending surface of the beam.

15. A linear light fixture assembly comprising:

the height adjustable ceiling mount assembly as recited in claim 1; and the linear light fixture, the base being fixed directly to the top surface of the linear light fixture.

16. A height adjustable ceiling mount assembly for a linear light fixture comprising:

a base configured for being connected to a top surface of the linear light fixture;

an arm extending upward from the base;

a mount for connecting to a beam of a ceiling installation to mount the linear light fixture on the ceiling installation; and a fastener for removably connecting the mount to the arm at a plurality of different vertical positions, the arm including a plurality of slots defining downward facing surfaces for vertically contacting the fastener at each of the vertical positions, the fastener including a threaded shaft fixed to the mount and a nut configured for removably fixing to the threaded shaft, the threaded shaft being configured for being alternatively passed horizontally through each slot.

17. A height adjustable ceiling mount assembly for a linear light fixture comprising:

a base configured for being connected to a top surface of the linear light fixture;

an arm extending upward from the base;

a mount for connecting to a beam of a ceiling installation to mount the linear light fixture on the ceiling installation; and a fastener for removably connecting the mount to the arm at a plurality of different vertical positions, the arm including a first vertically extending planar surface and a second vertically extending planar surface, the fastener including a nut for contacting the first vertically extending planar surface in a mounted orientation of the mount assembly, the mount configured for contacting the second vertically extending planar surface in the mounted orientation of the mount assembly, the arm including a plurality of slots, the fastener including a threaded shaft fixed to the mount, the nut being configured for removably fixing to the threaded shaft, the threaded shaft being configured for being alternatively passed horizontally through each slot.

* * * * *